United States Patent
Gadison et al.

(10) Patent No.: US 8,622,027 B1
(45) Date of Patent: Jan. 7, 2014

(54) ANIMAL PAW MASSAGER AND DIRT REMOVER

(76) Inventors: Diane Gadison, Orlando, FL (US); Steven E. Copeland, Orlando, FL (US)

(*) Notice: Subject to any disclaimer, the term of this patent is extended or adjusted under 35 U.S.C. 154(b) by 387 days.

(21) Appl. No.: 12/881,450

(22) Filed: Sep. 14, 2010

(51) Int. Cl.
*A01K 29/00* (2006.01)

(52) U.S. Cl.
USPC .......................................................... 119/673

(58) Field of Classification Search
USPC ......... 119/600–603, 650–652, 673, 671, 608, 119/609
See application file for complete search history.

(56) References Cited

U.S. PATENT DOCUMENTS

| | | | |
|---|---|---|---|
| 204,482 A * | 6/1878 | Crocker | 119/673 |
| 2,119,456 A * | 5/1938 | Dies | 70/129 |
| 3,378,004 A * | 4/1968 | Chase et al. | 601/166 |
| 3,683,896 A * | 8/1972 | Peplin | 601/16 |
| 3,965,495 A * | 6/1976 | McNair | 4/622 |
| 4,019,502 A * | 4/1977 | Elkins | 601/158 |
| 4,057,053 A * | 11/1977 | Kunz | 601/27 |
| 4,429,687 A * | 2/1984 | Friedson et al. | 601/15 |
| 4,497,313 A * | 2/1985 | Kurosawa | 601/16 |
| 4,523,580 A * | 6/1985 | Tureaud | 601/104 |
| 4,569,337 A * | 2/1986 | Baumann et al. | 601/46 |
| 5,797,352 A | 8/1998 | Ebert | |
| 6,065,431 A * | 5/2000 | Davis | 119/600 |
| 6,439,160 B1 | 8/2002 | Wheelwright | |
| 6,568,000 B1 * | 5/2003 | Kaufman et al. | 4/622 |
| 6,851,391 B1 | 2/2005 | Mulich et al. | |
| 7,111,585 B2 | 9/2006 | Hale et al. | |
| 7,302,915 B2 | 12/2007 | Leary et al. | |
| 2005/0224013 A1 | 10/2005 | Bestelmeyer | |
| 2007/0056525 A1 * | 3/2007 | Takahashi et al. | 119/651 |

\* cited by examiner

*Primary Examiner* — Kristen C Hayes
(74) *Attorney, Agent, or Firm* — Montgomery Patent & Design; Robert C. Montgomery

(57) ABSTRACT

An apparatus to aid in the cleaning of animal's paws comprises a plastic tub filled with water from a hose attached to a remote faucet and having a side-mounted drain valve. The apparatus also comprises a battery-operated vibrating system that vibrates a floor portion of the tub. Control of the vibrators is provided via a control switch located conveniently along a side panel. During use, the animal is placed or walked into the tub upon returning from the outdoors. The vibrating action along with the water removes all foreign material from the animal's lower legs and paws. Additionally, the vibrating action may be utilized to soothe and comfort the animal's paws.

10 Claims, 4 Drawing Sheets

ANIMAL PAW MASSAGER AND DIRT REMOVER

RELATED APPLICATIONS

Not Applicable.

FIELD OF THE INVENTION

The present invention relates generally to domestic pets, and in particular, to an apparatus adapted for the quick removal of dirt and debris from a pet's feet and legs.

BACKGROUND OF THE INVENTION

One (1) of the foremost responsibilities of caring for a domestic pet is that of allowing the pet to go to the bathroom. For many indoors animals, this requires either providing a designated bathroom area for the pet or allowing them to go outdoors at regular intervals. In many cases, this activity is undertaken several times every day.

A prominent inconvenience with most methods of allowing a pet to go to the bathroom is that the pet is prone to subsequently track substantial amounts of dirt and other foreign materials around the indoors of the domicile. Litter boxes and the like are rife with small bits of material which cling to a pet easily and are subsequently scattered about ground surfaces. Allowing a pet to go outdoors in order to go to the bathroom can result in the pet tracking dirt, moisture, and other foreign materials back into a house. This problem is particularly aggravated during unfavorable weather such as rain and snow. As a result, a caretaker is relegated to either cleaning the domicile afterwards or spending time in a difficult effort to wash and dry the pet upon reentering the house.

Various attempts have been made to provide devices which help to prevent tracking of dirt and foreign matter through a household by a pet. Examples of these attempts can be seen by reference to several U.S. patents. U.S. Pat. No. 5,797,352, issued in the name of Ebert, describes a paw cleaning litter mat which comprises a plurality of inclined louvers in order to trap and retain cat litter or the like prior to subsequent scattering throughout a domicile.

U.S. Pat. No. 6,439,160, issued in the name of Wheelwright, describes a paw cleaning apparatus for animals which provides vibrating brushes in order to effect removal of foreign material from an animal's lower extremities.

U.S. Pat. No. 6,851,391, issued in the name of Mulich et al., describes a cylindrical apparatus for brushing a single animal paw and leg and removing debris via a suctioning of the cylinder upon removal of the pet's leg.

U.S. Pat. No. 7,111,585, issued in the name of Hale et al., describes a paw cleaning device which provides localized moistening of an animal's paws as the animal traverses the device, effecting removal of dirt and the like.

While these devices fulfill their respective, particular objectives, each of these references suffer from one (1) or more of the aforementioned disadvantages. Many such devices depend upon the animal to engage the device, which results in inefficient use or necessary undesirable placement of the device within a domicile. Also, many such devices are uncomfortable or unpleasant for an animal to use. Furthermore, many such devices do not provide a sufficient level of cleaning to remove large amount of dirt and foreign material from a pet's paws. Accordingly, there exists a need for a pet paw and leg cleaning device without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide comfortable and thorough cleaning to a pet prior to entry into a domicile in a manner which is quick and easily repeatable for a caretaker. Thus, the object of the present invention is to solve the aforementioned disadvantages and provide for this need.

To achieve the above objectives, it is an object of the present invention to comprise an animal paw massager and dirt remover which provides an aid in the cleaning of an animal's paws. The apparatus comprises a plastic basin assembly and a plurality of vibrators. The vibrators are integrally housed within a lower portion of the basin assembly.

Another object of the present invention is to conduct vibrating energy into a contained cleaning fluid in order to clean an animal's paws and lower legs.

Yet still another object of the present invention is to provide enough space within the basin to accommodate a domestic pet standing within. The basin may be providing in various length and width sizes based upon intended utilization.

Yet still another object of the present invention is to provide a comfortable standing surface for an animal while promoting circulation of a contained fluid around the paws of an animal. A floor portion of the basin comprises a plurality of equally spaced hemispherical protrusions.

Yet still another object of the present invention is to facilitate transportation of the apparatus via handle portions which extend outward from a top rim of the basin.

Yet still another object of the present invention is to stabilize the apparatus upon a floor surface via a plurality of integrally molded supporting feet along a bottom portion of the apparatus.

Yet still another object of the present invention is to remove foreign material from an animal's paws and lower legs via vibrating motioning of the vibrators, a soluble cleaning fluid, and the textured floor portion of the basin.

Yet still another object of the present invention is to provide a soothing function to an animal via the vibrating motions of the vibrators.

Yet still another object of the present invention is to provide a draining means for a contained fluid via an integral drain valve located in a lower portion of the basin. The drain valve comprises a lever-operated valve and a male hose receptacle which allows connection to a hose to route the fluid to a suitable waste water receptacle.

Yet still another object of the present invention is to provide protective waterproof enclosure to the electrical components of the apparatus including the vibrators, a battery power source, and interconnecting wiring. The batteries are replaceable via a battery access panel along a bottom portion of the apparatus.

Yet still another object of the present invention is to allow a user to select a desired level of vibration to be applied to the basin and fluid via a variable output voltage control switch located along a side portion of the basin assembly.

Yet still another object of the present invention is to provide a method of utilizing the device that provides a unique means of obtaining an apparatus of a desired aesthetic appearance and size, installing batteries via the battery access panel, placing the apparatus upon a flat floor surface, filling the basin assembly with a desired volume of water and cleaning fluid, placing or walking a pet into the basin, motioning the control switch to provide a desired level of vibration, washing and treating the paw and lower legs of the pet via the vibrating motions, cleaning fluid, and textured floor portions of the basin, stopping the vibrations via the control switch, removing the animal from the apparatus, draining the fluid from the basin via the drain valve as desired, and allowing the pet to enter a domicile with substantially clean paws and legs.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
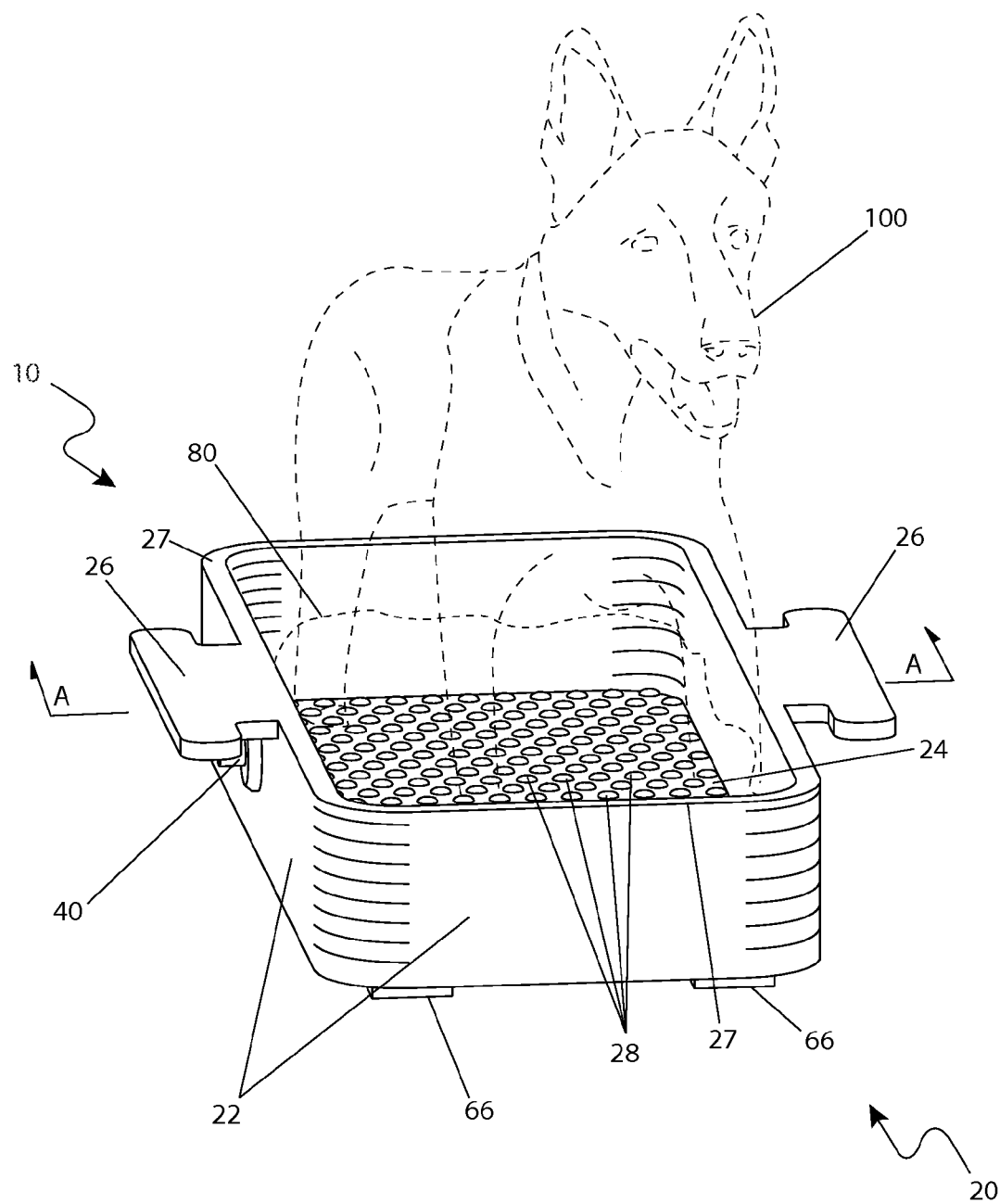
FIG. 1 is an environmental view of an animal paw massager and dirt remover 10, according to a preferred embodiment of the present invention.

| 10 | animal paw massager and dirt remover |
|---|---|
| 20 | basin assembly |
| 22 | side portion |
| 24 | floor portion |
| 25 | drain |
| 26 | handle |
| 27 | rim |
| 28 | protrusion |
| 30 | drain valve |
| 32 | valve handle |
| 35 | vibration |
| 40 | control switch |
| 41 | indicia |
| 42 | pointer |
| 50 | vibrator |
| 52 | electrical compartment |
| 60 | battery |
| 62 | battery access panel |
| 64 | latch |
| 66 | foot feature |
| 70 | wiring |
| 80 | fluid |
| 82 | supply water |
| 90 | supply hose |
| 100 | animal |
| 105 | fastening means |

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an animal paw massager and dirt remover (herein described as the "apparatus") 10, which provides an apparatus to aid in the cleaning of an animal's 100 paws comprising a plastic basin assembly 20 having a plurality of battery-powered vibrators 50 mounted below a basin floor portion 24. The vibrators 50 conduct vibrating energy 35 into a contained cleaning fluid 80 to clean the animal's 100 paws. The frequency of the vibrators 50 is controlled by a rheostatic control switch 40 conveniently located along a side portion 22 of the apparatus 10.

Referring now to FIG. 1, an environmental view of the apparatus 10, according to a preferred embodiment of the present invention, is disclosed. The apparatus 10 comprises a rectangular semi-rigid plastic basin assembly 20 approximately three (3) feet in length and width, and approximately four (4) to six (6) inches in depth; however, it is envisioned that the apparatus 10 may be introduced having various length and width sizes based upon utilization with different sized animals 100. The basin assembly 20 is to be large enough to allow most animals such as dogs, cats, and other pets, to stand comfortably within. The basin assembly 20 further comprises four (4) side portions 22, a floor portion 24, and a small horizontal rim 27 all around a top perimeter edge. The basin assembly 20 is envisioned to be introduced in various decorative colors and patterns based upon a user's preference. The floor portion 24 provides a textured upper surface comprising a plurality of equally-spaced hemispherical protrusions 28 being approximately one-quarter (¼) of an inch in diameter. Said protrusions 28 provide a comfortable surface onto which the animal 100 may stand as well as promoting circulation of the contained fluid 80 around the paws of the animal 100. Two (2) opposing side portions 22 of said basin assembly 20 comprise respective ovular-shaped handle portions 26 which extend outwardly from the rim 27 along a horizontal plane, providing easy transporting of the apparatus 10. The basin assembly 20 also comprises a plurality of supporting foot features 66 envisioned to be of a low-profile design, integrally-molded into the bottom surface of said basin assembly 20, and located at each bottom corner area to help stabilize the apparatus 10 when placed upon a floor surface.

The apparatus 10 is to be partially filled with a cleansing fluid 80 envisioned to be a solution of soap, water, and various additives based upon an intended treatment, a level of soiling of the animal's 100 paws, and a user's preference. The apparatus 10 provides a vibrating means to said fluid 80 to promote cleansing via a plurality of vibrators 50 which are controlled by a control switch 40 (see FIGS. 2 and 3). The vibration 35, the soluble fluid 80, and the textured floor portion 24 of the basin assembly 20, combine to remove foreign material from the animal's 100 lower legs and paws, thereby preferably allowing the animal 100 to enter a structure with clean paws. Additionally, the vibration 80 may be utilized to soothe and/or comfort the animal 100 if needed.

Figure 2:
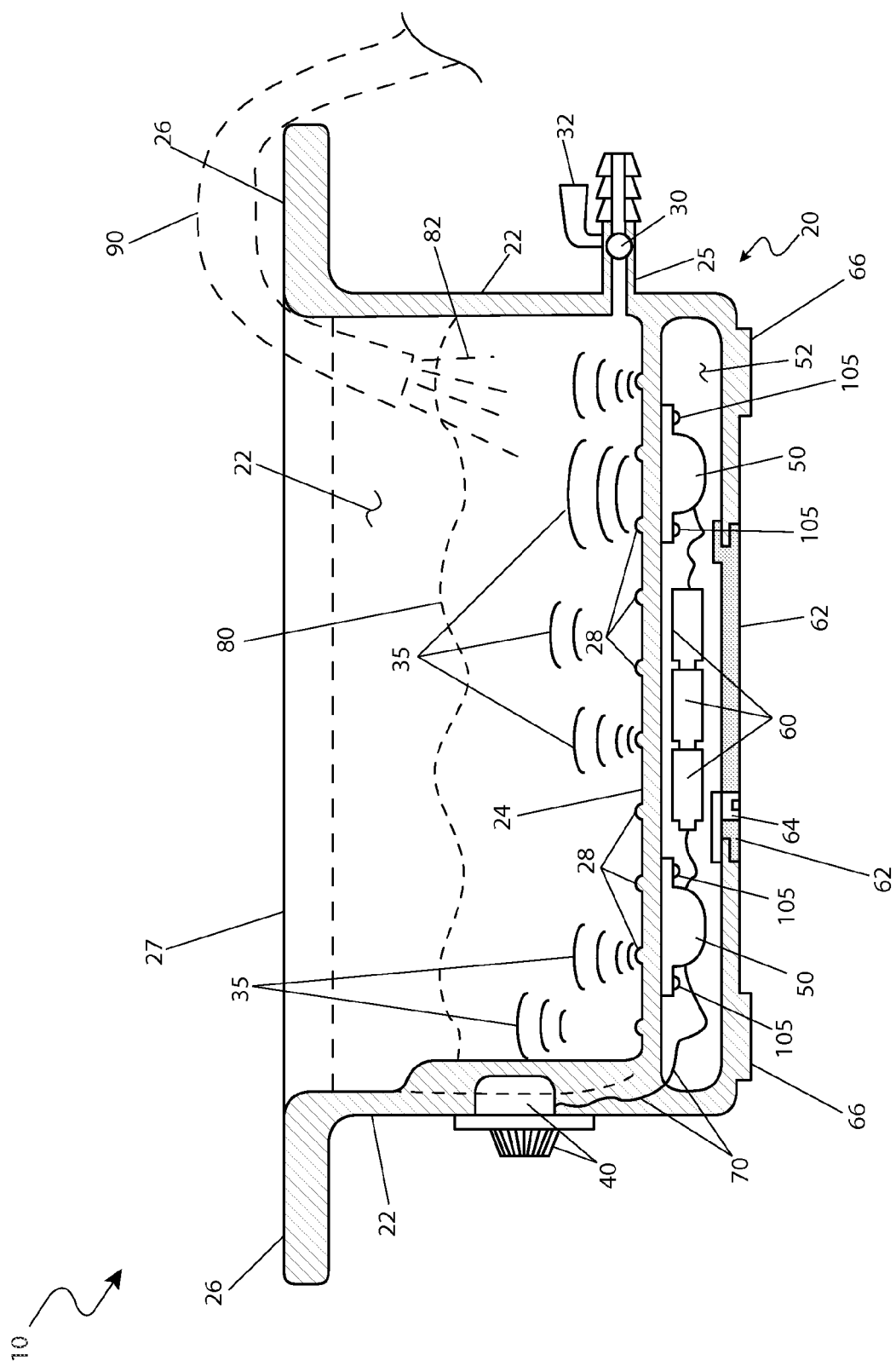
FIG. 2 is a section view of the animal paw massager and dirt remover 10 taken along section line A-A (see FIG. 1), according to a preferred embodiment of the present invention.

Referring now to FIG. 2, a section view of the apparatus 10 taken along section line A-A (see FIG. 1), according to a preferred embodiment of the present invention, is disclosed. The apparatus 10 comprises a drain valve 30, a control switch 40, a pair of vibrators 50, and a plurality of batteries 60. The basin assembly 20 is filled with supply water 82 having a desired temperature being regulated by a remotely located faucet and conveyed into the basin assembly 20 using a common hose 90. It is envisioned that various additives may be mixed with the supply water 82 such as liquid soap, Magnesium sulfate (Epsom salts), or other additives to provide various treatments and/or cleansing of the animal's 100 paws.

The basin assembly 20 further comprises a drain 25 and a drain valve 30 which extend horizontally outward from a side portion 22, providing convenient periodic draining of the fluid 80 from the basin assembly 20 as needed. The drain valve 30 is envisioned to comprise a common lever-operated quarter-turn ball valve having a male-barbed exit orifice which provides convenient connection to a hose to route said fluid 80 to a suitable waste water receptacle.

The basin assembly 20 comprises a hollow electrical compartment 52 subjacent to the floor portion 24. Said electrical compartment 52 extends along an entire lower portion of said floor portion 24 being approximately one (1) to two (2) inches in height and providing protective enclosure of said vibrators 50 and batteries 60 being interconnected via interconnecting wiring 70.

The vibrators 50 comprise common motorized units having an enclosed offset weighted shaft similar to units used in cellular telephones, massaging devices, and the like. The vibrators 50 comprise integral mounting features which provide a mounting means to a bottom surface of the basin floor portion 24 in an inverted orientation using a fastening means 105 such as adhesives, rivets, screws, or the like. An actual number of, and arrangement of said vibrators 50 is to be based upon a horsepower rating of a specific vibrator 50 being utilized and a desired vibration 35 energy level to be generated, and as such should not be interpreted as a limiting factor of the apparatus 10.

The vibrators 50 are battery 60 powered and conduct a variable frequency mechanical vibration 35 into the textured basin floor portion 24 and subsequently into the contained cleansing fluid 80 within the basin assembly 20. The batteries 60 are envisioned to be common rechargeable or disposable cells which are accessed for replacement via a flush-mounted battery access panel 62 incorporated into the bottom surface of the electrical compartment 52 and secured using a common half-turn latch 64. The vibrators 50 are controlled via a control switch 40 (see FIG. 3).

Figure 3:
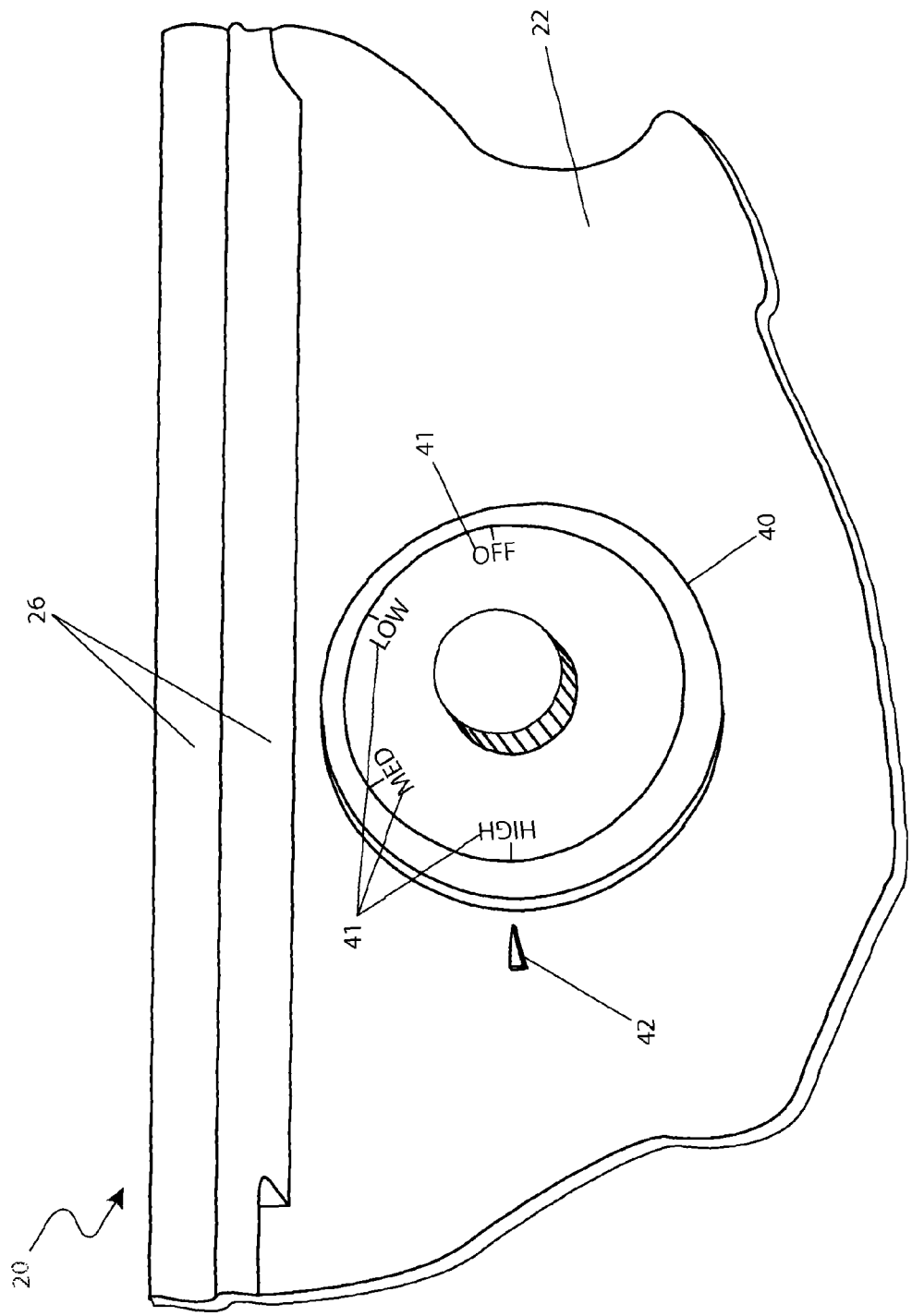
FIG. 3 is an upward-looking view of a control knob portion 40 of the animal paw massager and dirt remover 10, according to a preferred embodiment of the present invention; and, FIG. 4 is an electrical block diagram of the animal paw massager and dirt remover 10, according to a preferred embodiment of the present invention.

Referring now to FIG. 3, an upward-looking view of a control knob portion 40 of the apparatus 10, according to a preferred embodiment of the present invention, is disclosed. The frequency and resultant energy level produced by said vibrators 50 is controlled via a variable output voltage-type control switch 40 located along a side portion 22 of the basin assembly 20. The control switch 40 preferably comprises a common rotary rheostat-type component providing both an ON/OFF function as well as visual indicia 41 indicating a selected vibration 35 intensity such as "OFF", "LOW", "MED", and "HIGH" along a front surface of said switch 40, thereby allowing a user to select a desired vibration 35 to be applied to the fluid 80; however, it is understood that various other types of control switches may be utilized to produce a desired vibration 35 and as such should not be interpreted as a limiting factor of the apparatus 10. The apparatus 10 comprises a molded-in pointer arrow 42 which indicates the selected vibration level indicia 41.

Figure 4:
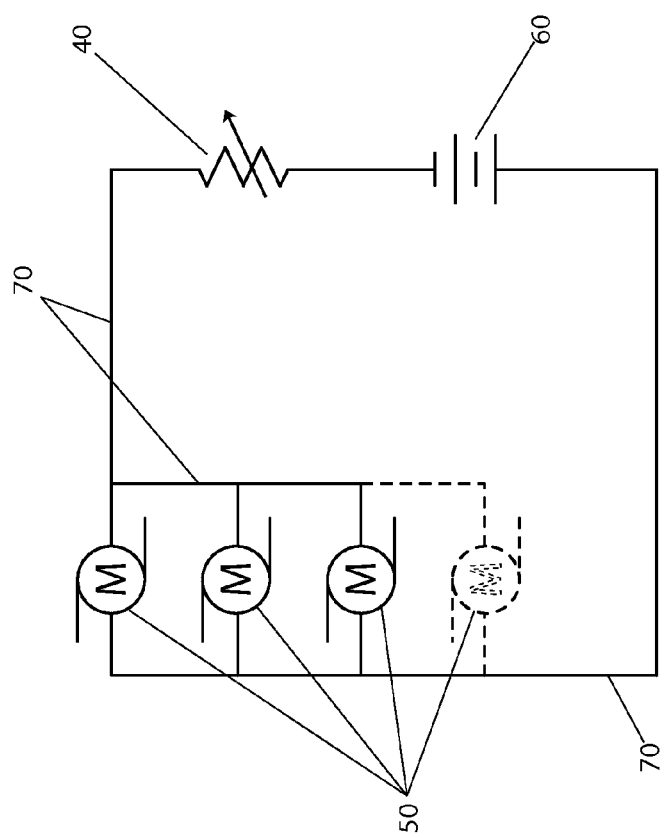

Referring now to FIG. 4, an electrical block diagram of the apparatus 10, according to a preferred embodiment of the present invention, is disclosed. Direct current (DC) power is conducted from the batteries 60 to the control switch 40 via common copper interconnecting wiring 70. The control switch 40 in turn provides an ON/OFF function as well as acting to regulate a variable voltage synchronously to the plurality of vibrators 50. The vibrators 50 are envisioned being wired using a parallel circuit arrangement.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be utilized as indicated in FIG. 1.

The method of installing and utilizing the apparatus 10 may be achieved by performing the following steps: procuring the apparatus 10 having a desired color, pattern, and size; removing the battery access panel 62 from the bottom of the apparatus 10 using the latch 64; installing a fresh set of disposable batteries 60 or a recently charged set of rechargeable batteries 60 into the electrical compartment 52; replacing the battery access panel 62 and securing same using the latch 64; placing the foot portions 66 of the apparatus 10 upon a flat surface; filling the basin assembly 20 with a desired volume of supply water 82 being conveyed using a common flexible hose 90 and comprising a pre-regulated temperature and pressure via a remote faucet; mixing additives, if desired, into the supply water to produce a cleansing or soothing fluid 80; placing or walking the animal 100 into the basin assembly 20; slowly motioning the control switch 40 from the "OFF" position to the vibration range of the control switch 40 in a gradual manner so as to not startle the animal 100; rotating the control switch 40 until obtaining a desired vibration level in the fluid 80; allowing a period of time to wash or treat the paw portions of the animal 100; rotating the control switch 40 to the "OFF" position to stop the vibration 35; removing or walking the animal 100 out of the apparatus 10; draining the fluid 80 from the basin assembly 20 using the drain valve 30 as needed; and, benefiting from an effortless and timely means of washing, soothing, and/or treating an animal's 100 paws using the present invention 10.

Following the washing of the animal's 100 paws, a user may desire to dry the paws of the animal 100 in a normal manner prior to allowing the animal 100 to enter a structure.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An animal paw massager and dirt remover for cleaning an animal paw, said animal paw massager and dirt remover comprising:

a basin assembly comprising a floor portion and four side portions defining an internal volume configured to receive a fluid and an animal paw, and a bottom portion connected to said plurality of side portions below said floor portion, said floor portion, said side portions, and said bottom portion defining a compartment, said basin assembly further comprising a horizontal rim formed around a top perimeter edge said four side portions, said horizontal rim being located at a top most surface of said basin assembly;

a plurality of protrusions extending from said floor portion, said plurality of protrusions being configured to engage said animal paw;

a plurality of vibrators located in said compartment and directly connected to said floor portion;

a control knob electrically connected to said plurality of vibrators and configured to control a frequency of said vibrators;

a removable power source disposed within said compartment, said removable power source being electrically connected to said plurality of vibrators and said control knob;

wherein said protrusions conduct vibrating energy from said vibrators and circulate said fluid within said internal volume and around said animal paw to remove foreign material from said animal paw;

wherein said compartment comprises:
a flush-mounted access panel removably connected to said bottom portion, said access panel being configured to access said removable power source within said compartment; and a half-turn latch configured to secure said access panel to said bottom panel; wherein said compartment provides a protective enclosure for said plurality of vibrators and said removable power source.

2. The animal paw massager and dirt remover of claim 1, wherein said basin assembly further comprises:
a pair of handles extending outwardly from said rim along a horizontal plane of two opposing ones of said four side portions; and,
a plurality of foot features integrally molded into said bottom portion.

3. The animal paw massager and dirt remover of claim 2, wherein said basin assembly further comprises:
a drain; and,
a drain valve extending horizontally and outwardly from one of said four side portions, said drain valve being configured to drain said fluid from said internal volume;
wherein said drain valve is a lever-operated quarter-turn ball valve having a male-barbed exit orifice adapted to route said fluid out of said internal volume.

4. The animal paw massager and dirt remover of claim 1, wherein said compartment comprises:
a flush-mounted access panel removably connected to said bottom portion, said access panel being configured to access said removable power source within said compartment; and,
a half-turn latch configured to secure said access panel to said bottom panel;
wherein said compartment provides a protective enclosure for said plurality of vibrators and said removable power source.

5. The animal paw massager and dirt remover of claim 1, wherein said plurality of vibrators is mounted to a bottom surface of said floor portion and situated at an inverted orientation;

wherein said vibrating energy is a variable frequency mechanical vibration conducted through said floor portion and into said fluid within said internal volume; and,
wherein said vibrators are controlled using said control knob.

6. An animal paw massager and dirt remover for cleaning an animal paw, said animal paw massager and dirt remover comprising:
a basin assembly comprising a floor portion and four side portions defining an internal volume configured to receive a fluid and an animal paw, and a bottom portion connected to said plurality of side portions below said floor portion, said floor portion, said side portions, and said bottom portion defining a compartment located subjacent to said internal volume and extending along an entirety of said floor portion, said basin assembly further comprising a horizontal rim formed around a top perimeter edge said four side portions, said horizontal rim being located at a top most surface of said basin assembly;

a plurality of equally-spaced hemispherical protrusions extending from said floor portion into said internal volume, said plurality of protrusions being configured to engage said animal paw;

a plurality of vibrators located in said compartment and directly connected to said floor portion;

a control knob electrically connected to said plurality of vibrators and configured to control a frequency of said vibrators; and, a removable power source disposed within said compartment, said removable power source being electrically connected to said plurality of vibrators and said control knob;

a flush-mounted access panel removably connected to said bottom portion, said access panel being configured to access said removable power source within said compartment; and a half-turn latch configured to secure said access panel to said bottom panel;

wherein said protrusions conduct vibrating energy from said vibrators and circulate said fluid within said internal volume and around said animal paw to remove foreign material from said animal paw.

7. The animal paw massager and dirt remover of claim 6, wherein said basin assembly further comprises:
a pair of handles extending outwardly from said rim along a horizontal plane of two opposing ones of said four side portions; and,
a plurality of foot features integrally molded into said bottom portion.

8. The animal paw massager and dirt remover of claim 7, wherein said basin assembly further comprises:
a drain; and,
a drain valve extending horizontally and outwardly from one of said four side portions, said drain valve being configured to drain said fluid from said internal volume;
wherein said drain valve is a lever-operated quarter-turn ball valve having a male-barbed exit orifice adapted to route said fluid out of said internal volume.

9. The animal paw massager and dirt remover of claim 6, wherein said compartment comprises:
wherein said compartment provides a protective enclosure for said plurality of vibrators and said removable power source.

10. The animal paw massager and dirt remover of claim 6, wherein said plurality of vibrators is mounted to a bottom surface of said floor portion and situated at an inverted orientation;
    wherein said vibrating energy is a variable frequency mechanical vibration conducted through said floor portion and into said fluid within said internal volume; and,
    wherein said vibrators are controlled using said control knob.

\* \* \* \* \*